(12) United States Patent
Kadlec

(10) Patent No.: US 6,867,863 B1
(45) Date of Patent: Mar. 15, 2005

(54) INTEGRATED DIAGNOSTIC FOR PHOTOELASTIC MODULATOR

(75) Inventor: Paul Kadlec, Vail, AZ (US)

(73) Assignee: Hinds Instruments, Hillsboro, OR (US)

( * ) Notice: Subject to any disclaimer, the term of this patent is extended or adjusted under 35 U.S.C. 154(b) by 0 days.

(21) Appl. No.: 09/936,967
(22) PCT Filed: Mar. 31, 2000
(86) PCT No.: PCT/US00/08625
§ 371 (c)(1), (2), (4) Date: Feb. 25, 2002
(87) PCT Pub. No.: WO00/58699
PCT Pub. Date: Oct. 5, 2000

Related U.S. Application Data
(60) Provisional application No. 60/127,263, filed on Mar. 31, 1999.

(51) Int. Cl.[7] .............................. G01J 4/00; G01J 3/45; G01B 9/02; G02F 1/01; G02F 1/03
(52) U.S. Cl. ............... 356/364; 356/365; 356/453; 356/456; 359/239; 359/256
(58) Field of Search .............................. 356/364–365, 356/450–451, 453, 456, 491; 359/238–239, 256

(56) References Cited
U.S. PATENT DOCUMENTS

| | | | | |
|---|---|---|---|---|
| 4,905,169 A | * | 2/1990 | Buican et al. ............... | 356/365 |
| 5,652,673 A | * | 7/1997 | Oakberg ...................... | 359/308 |
| 5,886,810 A | * | 3/1999 | Siahpoushan et al. ....... | 359/285 |
| 6,025,913 A | * | 2/2000 | Curbelo ...................... | 356/453 |
| 6,421,131 B1 | * | 7/2002 | Miller ......................... | 356/453 |
| 6,473,179 B1 | * | 10/2002 | Wang et al. ................. | 356/364 |
| 2003/0020911 A1 | * | 1/2003 | Wang et al. ................. | 356/364 |

FOREIGN PATENT DOCUMENTS
WO  WO 9947966 A1 * 9/1999 ............. G02F/1/11

* cited by examiner

*Primary Examiner*—Judy Nguyen
*Assistant Examiner*—Magda Cruz
(74) *Attorney, Agent, or Firm*—Ipsolon LLP

(57) ABSTRACT

A diagnostic system (24) for a PEM (20) provides optically determined information about the retardance characteristics induced by the PEM (20). The diagnostic system (24) is integrated with the PEM (20) so that the PEM (20) performance may be diagnosed or monitored during operation of the PEM (20). Specifically, the diagnostic system (24) is used alongside an optical setup (22) that employs a primary light beam (28) for conventional purposes such as polarimetry, optical metrology, etc. The diagnostic system (24) includes its own diagnostic light source (50) that is directed through the optical element (32) of the PEM (20) at a location remote from the primary aperture (38) of the PEM (20). Thus, the diagnostic system (24) and the primary PEM (20) operation can be undertaken simultaneously, with one not interfering with the other. The output of the diagnostic system reflects the actual retardance characteristic provided by the PEM (20) and can be used as feedback to adjust the PEM control as needed.

23 Claims, 1 Drawing Sheet

INTEGRATED DIAGNOSTIC FOR PHOTOELASTIC MODULATOR

This application claims the benefit of Provisional No. 60/127,263 filed Mar. 31, 1999.

TECHNICAL FIELD

This application relates to an integrated optical diagnostic system for a photoelastic modulator.

BACKGROUND AND SUMMARY OF THE INVENTION

A resonant photoelastic modulator (PEM) is an instrument that is used for modulating the polarization of a beam of light. A PEM employs the photoelastic effect as a principle of operation. The term "photoelastic effect" means that an optical element that is mechanically strained (deformed) exhibits birefringence that is proportional to the amount of strain induced into the element. Birefringence means that the refractive index of the element is different for different components of polarized light.

A PEM includes an optical element, such as fused silica, that has attached to it a piezoelectric transducer for vibrating the optical element at a fixed frequency, within, for example, the low-frequency, ultrasound range of about 20 kHz to 100 kHz. The mass of the element is compressed and extended as a result of the vibration.

The compression and extension of the optical element imparts oscillating birefringence characteristics to the optical element. The frequency of this oscillating birefringence is the resonant frequency of the optical element and is dependent on the size of the optical element, and on the velocity of the transducer-generated longitudinal vibration or acoustic wave through the optical element.

Retardation or retardance represents the integrated effect of birefringence acting along the path of electromagnetic radiation (a light beam) traversing the vibrating optical element. If the incident light beam is linearly polarized, two orthogonal components of the polarized light will exit the optical element with a phase difference, called the retardance. For a PEM, the retardation is a sinusoidal function of time. The amplitude of this phase difference is usually characterized as the retardance amplitude or retardation amplitude of the PEM.

Both the size and acoustic wave velocity of a PEM depend on the optical element's temperature. Consequently, the resonant frequency of a PEM will also depend on the device's temperature. In general, this temperature depends on two factors: (1) the ambient temperature, and (2) the amplitude of the stress oscillations in the optical element. At high stress amplitudes, the amount of acoustic (mechanical) energy absorbed in the optical element can become significant. As the absorbed acoustic energy is converted to heat within the mass of the element, significant temperature increases and corresponding shifts in the PEM's resonant frequency can occur.

Thus, even though the retardation amplitude of a PEM can be adjusted at will (within the limits set by the maximum driving voltage provided by the electronic circuits), the system's operating frequency is determined by the PEM's resonant frequency and, as explained above, thus depends on both ambient temperature and the amplitude at which the PEM is driven. This results in an operating frequency that drifts with ambient temperature, as well as during warm-up and after changes in the set retardation amplitude. Such a situation may be undesirable in certain applications where the PEM's operating frequency, as well as its amplitude, must be kept constant.

In view of the foregoing, one can appreciate the value of real-time information indicating the actual performance of the PEM (that is, the particulars of the retardance characteristics induced by the PEM into the light that passes through it). Moreover, this information may be used as feedback control of the PEM to more accurately control the PEM operation.

The present invention is generally directed to a diagnostic system for a PEM. The system provides optically determined information about the retardance characteristics induced by the PEM.

In a preferred embodiment, the diagnostic system is integrated with the PEM so that the PEM performance may be diagnosed or monitored during operation of the PEM. Specifically, the diagnostic system is used alongside an optical setup that employs a primary light beam for conventional purposes such as polarimetry, optical metrology, etc. The diagnostic system includes its own diagnostic light source that is directed through the optical element of the PEM at a location remote from the primary aperture of the PEM. Thus, the diagnostic system and the primary PEM operation can be undertaken simultaneously, with one not interfering with the other.

Other advantages and features of the present invention will become clear upon review of the following portions of this specification and the drawings.

BEST MODES FOR CARRYING OUT THE INVENTION

Figure 1:
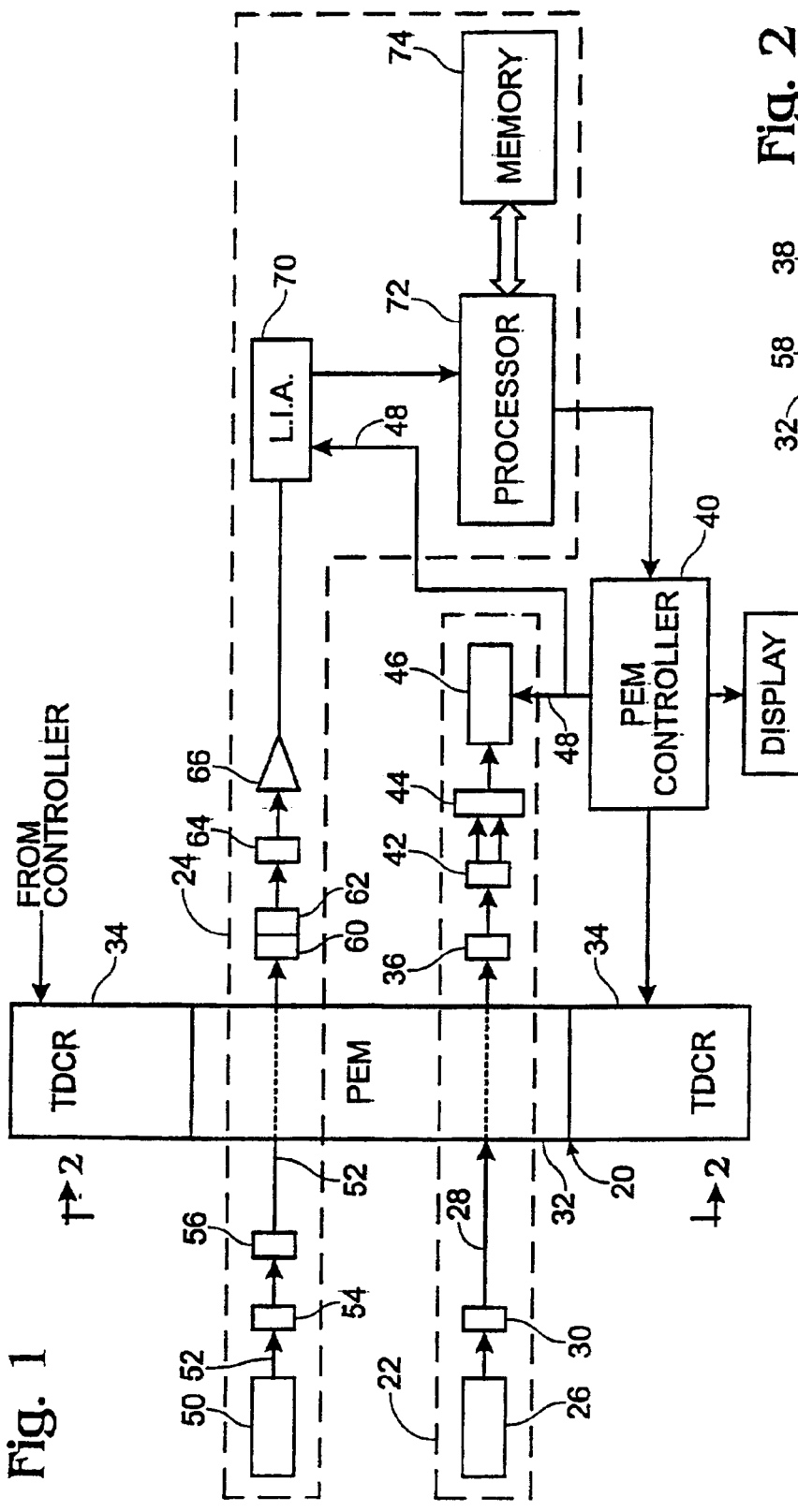
FIG. 1 is a diagram of a preferred embodiment of the integrated diagnostic system for a photoelastic modulator configured in accordance with the present invention.

The diagram of FIG. 1 depicts a photoelastic modulator (PEM) 20 that is used in a primary optical setup 22 (described more below) and that has integrated with it a diagnostic system 24 configured in accordance with present invention.

Primary Optical Setup

The block 22 shown in dashed lines in FIG. 1 is intended to represent any of a variety of optical setups with which a PEM may be employed. One such setup is described in international application number PCT/US99/03481, hereby incorporated by reference (the '481 application).

The setup employed in the '481 application is used for precise measure of the birefringence characteristics of an optical sample. That setup is summarized next for the purposes of explaining an exemplary, primary setup 22 with which the later-described diagnostic system may be integrated.

The primary setup 22 includes a primary light source 26 such as a HeNe laser that has a wavelength of 632.8 nanometers (nm). The light beam 28 emanating from the source has a cross sectional area or "spot size" of approximately 1 millimeter (mm).

The primary light beam 28 is directed to be incident on a polarizer 30 that is oriented with its polarization direction at +45° relative to a baseline axis. A high-extinction polarizer, such as a Glan-Thompson calcite polarizer, is preferred. It is also preferred that the polarizer 30 be secured in a precision, graduated rotator.

The polarized light from the polarizer 30 is incident on the optical element 32 of the PEM 20. In a preferred embodiment, the PEM is one manufactured by Hinds Instruments, Inc., of Hillsboro, Oregon, as a low-birefringence version of Model PEM-90 I/FS50. The primary beam 28 is directed through the primary aperture 38, which, in a bar-type optical element, is located at the center of the optical element 32 and provides the maximum oscillating birefringence effect (hence, producing the greatest retardance amplitude in the primary beam). The birefringence effect diminishes in the direction away from the aperture, toward the ends of the optical element.

The PEM 20 has its birefringent axis oriented at 0° and is controlled by a controller 40 that imparts an oscillating birefringence to the optical element 32, preferably at a nominal frequency of 50 kHz. In this regard, the controller 40 drives two quartz transducers 34 between which the optical element 32 is bonded with an adhesive.

The oscillating birefringence of the PEM 20 introduces retardance characteristics into the primary beam 28. As noted, retardance can be considered as the time-varying phase difference between the orthogonal components of the polarized light that propagates through the PEM. The peak amplitude of this phase shift is referred to as the PEM's retardance, and is measurable in units of length, such as nanometers. The PEM controller 40 provides controls for adjusting the amplitude of the retardance introduced by the PEM. In the case at hand, the retardation amplitude may be selected to be 0.383 waves (242.4 nm).

The beam of primary light 28 propagating from the optical element 32 of the PEM is directed through the transparent sample 36. The sample is supported in the path of the beam by a sample stage that is controllable for moving the sample in a translational sense along orthogonal (X and Y) axes. The stage may be any one of a number of conventional designs. The motion controllers of the sample stage are driven to enable scanning the sample 36 with the beam, thereby to arrive at a plurality of retardance and orientation measurements across the area of the sample.

The sample 36 will induce its own retardance into the primary beam that passes through it. In the exemplary primary optical setup 22, it is this retardance value that is determined. To this end, the beam emanating from the sample 36 is directed through a beam splitter 42, a two-channel detector 44, and processing hardware 46 that includes a lock-in amplifier that relies on a reference signal 48 from the PEM controller 40 for signal capture.

One can appreciate that, irrespective of the nature of the processing of the primary beam 28 emanating from the PEM, accuracy is enhanced when the system is provided with the actual (as opposed to selected) retardance characteristics induced in that beam by the optical element 32 of the PEM 20. This is what the integrated diagnostic system 24 provides, a preferred embodiment of which is explained next.

Diagnostic System Setup

The diagnostic system 24 includes its own discrete light source 50, which is a monochromatic laser, which makes the diagnostic system inherently self-calibrating. The beam 52 emanating from that source (hereafter referred to as the diagnostic light beam 52) is directed through a collimating lens 54. A polarizer 56 is located next in the setup for the purpose of removing unwanted birefringence effects that may have been introduced by the optical components of the source 50 or lens 54.

The diagnostic light 52 then passes through the optical element 32. In this regard it is noteworthy that the diagnostic beam 52 is not directed through the primary aperture 38. Rather, the beam 52 is directed through a secondary, "diagnostic" aperture 58 that is remote from the primary aperture 38. This enables the simultaneous operation of both the primary and diagnostic optical system without one interfering with the other. As will be explained more fully below, this real-time availability of diagnostic information can be (after suitable processing) displayed and/or used for feedback control of the PEM.

Before proceeding, it is noteworthy here that a secondary aperture for the diagnostic beam 52 is not critical. That is, the present invention contemplates that the primary aperture 38 may be used for both the primary and diagnostic beam. This could be accomplished in a situation where, for example, the primary beam 28 could be intermittently halted while the diagnostic beam is directed through the primary aperture 38. Movable mirrors may be employed to direct the particular beam (diagnostic and primary) to the corresponding detector and processing. As noted, however, separate apertures are preferred.

The diagnostic beam 52 emanating from the PEM optical element 32 passes through an optional waveplate 60 that reduces the operating output frequency of the PEM to equal to the eigenfrequency (resonant frequency) of the PEM.

An analyzer 62 then eliminates the unwanted complex component from the diagnostic beam. In a preferred embodiment, the waveplate 60 and analyzer 62 are combined and provided as a commercially-available circular polarizer.

The diagnostic beam 52 next impinges on a detector 64, such as a photodiode. The detector 64 produces as output a current signal representative of the time varying intensity of the received diagnostic light.

The wavelength of the diagnostic beam 52, as well as the location where that beam strikes the optical element 32, is preferably selected to achieve optimum sensitivity to the modulation level of the detector 64, while avoiding interference with the operating frequency of the primary beam 28.

The detector output is delivered to a preamplifier 66. The preamplifier 66 provides output to a phase sensitive device (preferably a lock-in amplifier 70) in the form of a low-impedance intensity signal $V_{AC}$, and a DC intensity signal $V_{DC}$, which represents the time average of the detector signal. The lock-in amplifier is provided with the reference signal 48 of the PEM controller 40 for the purpose of capturing the output from the detector. This captured signal reflects the retardance induced into the diagnostic beam 52 by the optical element (that is, the portion of the optical element at the diagnostic aperture 58). In the preferred embodiment, this diagnostic-retardance signal is converted to DC signals and provided to a microprocessor 72.

The microprocessor 72 initially addresses the task of converting the diagnostic-retardance signal into a signal representative of the retardance induced in the primary beam 28 (which passes through the primary aperture—the region of greatest induced retardance). Put another way, the retardance induced in the diagnostic beam 52 is relatively smaller than the retardance induced in the primary beam. The signal indicative of the diagnostic-beam retardance, therefore, is processed to arrive at a corresponding value of the primary-beam retardance. The primary-beam retardance is extrapolated from the diagnostic-beam retardance via the following calculations:

$$I(t)=I_0/2(1-\cos(\delta_b+\delta_m \sin(\omega_m t)))$$

$$\delta_b=\pi/2$$

where $\delta_b$ is the retardance of the fixed waveplate 60; $\delta_m$ is the peak retardance of the PEM 20 at the location of the diagnostic beam's central ray; $I_0$ is the peak intensity at the detector 64; and $\omega_m$ is the resonant frequency of the PEM. To extrapolate the value of $\delta_m$ to a different location on the PEM (that is, to the center of the primary aperture 38) the following equation applies:

$$\delta=\delta_m \sec(2D/L)$$

where $\delta$ is the extrapolated retardance of the PEM at the center of the PEM primary aperture 38; D is the distance from the center of the primary aperture 38 to the center of the diagnostic aperture 58; and L is the length of the PEM optical element 32.

Figure 2:
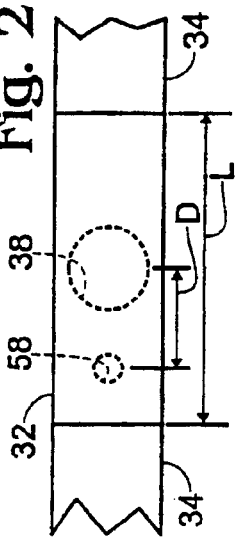
FIG. 2 is a diagram showing one side of a part of a photoelastic modulator component of the present system.

The dimensions D and L are illustrated in FIG. 2. In a preferred embodiment, the distance D is 20 millimeters (mm) and the length L of the optical element is 57.3 mm.

The constants used in the foregoing equations are stored in the firmware of the diagnostic system, such firmware being illustrated as memory 74 in FIG. 1. That memory is preferably a read-only (ROM) type, the contents of which are programmed during factory calibration of the diagnostic system.

While the apertures 38, 58 have been illustrated as circles in the FIG. 2, it is pointed out that, as respects the optical element 32, there is no indicia on that component representing the aperture. The optical element 32, however, is mounted to and enclosed in a housing. Thus, the circles appearing in FIG. 2 can be considered as representing the openings in the otherwise opaque housing, which openings expose the apertures 38, 58 to the respective diagnostic and primary light beams. In the preferred embodiment, the opening for the primary aperture 38 is a circle with a diameter of 14 mm. The opening for the diagnostic aperture 58 is a circle having a 5 mm diameter.

In a preferred embodiment, most of the components of the diagnostic system (but for the laser source 50) are mounted directly to the PEM housing, with the electrical components being carried on an associated printed circuit board that is also mounted in the housing.

The primary-beam retardance characteristic (such as retardance amplitude) that is generated by the processor 72 is provided to the PEM controller 40. That signal is then displayed 76, real-time, as the primary system 22 is operated.

In a preferred embodiment, the diagnostic signal indicating a retardance characteristic of the primary beam, which is provided by the processor 72 to the PEM controller 40, is converted into a PEM control signal. That is, the central processing unit of the PEM controller compares the retardance characteristic (such as retardance amplitude) selected by the user with the "actual" retardance characteristic received from the diagnostic processor 72. In instances where these two values are different, an error signal corresponding to that difference is generated and used to change the drive signal applied to the transducers 34 until the actual value reaches the selected.

While the present invention has been described in terms of preferred embodiments, it will be appreciated by one of ordinary skill that the spirit and scope of the invention is not limited to those embodiments, but extend to the various modifications and equivalents as defined in the appended claims.

What is claimed is:

1. An integrated photoelastic modulator and diagnostic system comprising:
    a photoelastic modulator including an optical element having a primary aperture through which primary light is directed; and
    a diagnostic system including a diagnostic light source for directing through the optical element diagnostic light that is distinct from the primary light, wherein the diagnostic light source is configured so that the diagnostic light is directed through the optical element at a location remote from the primary aperture.

2. The system of claim 1 wherein the photoelastic modulator is operable to provide retardance characteristics in primary light that is directed through the optical element, and wherein the diagnostic system includes processing means for determining at least one retardance characteristic provided by the photoelastic modulator.

3. The system of claim 2 including display means for displaying the retardance characteristic determined by the processing means.

4. The system of claim 2 including feedback means for converting signals representing the determined retardance characteristic into control signals for the photoelastic modulator.

5. The system of claim 1 wherein the photoelastic modulator is operable to provide retardance characteristics in primary light that is directed through the optical element, and wherein the diagnostic system includes processing means for determining a retardance characteristic of the diagnostic light and using the retardance characteristic of the diagnostic light to calculate a retardance characteristic in the primary light that is provided by the photoelastic modulator.

6. The system of claim 1 wherein the diagnostic light source provides diagnostic light that has a wavelength other than the wavelength of the primary light.

7. A method of operating a photoelastic modulator that is operable for vibrating an optical element to impart retardance characteristics in a primary light beam that is directed through the optical element, comprising the steps of:
    directing a diagnostic beam of light through the optical element;
    determining a retardance characteristic of the diagnostic beam of light that passes through the optical element;
    generating a diagnostic signal representative of that retardance characteristic; ad
    converting the diagnostic signal to a verification signal that is representative of a retardance characteristic of the primary light beam.

8. The method of claim 7 including the step of converting the diagnostic signal into a control signal for controlling the photoelastic modulator.

9. The method of claim 7 including the step of transmitting the primary light beam and the diagnostic beam of light through the optical element so that the beams do not cross each other.

10. The method of claim 9 wherein the directing step includes the step of directing the diagnostic beam of light through a portion of the optical element that is spaced an offset distance from another portion of the optical element, through which other portion the primary light beam is directed such that the retardance characteristic of the diagnostic beam of light is different from the imparted retardance characteristic in a primary light beam.

11. The method of claim 10 including the step of considering the offset distance and the diagnostic signal for determining a verification signal that is representative of a retardance characteristic of the primary light beam.

12. The method of claim 9 including the step of housing the optical element in a manner that defines two discrete apertures through which the primary and diagnostic light beams may be directed so that the primary beam is transmitted through one aperture and the diagnostic beam is transmitted through the other aperture.

13. The method of claim 7 wherein the directing step includes the step of selecting a wavelength of the diagnostic beam to be different from the wavelength of the primary beam.

14. A diagnostic system for a photoelastic modulator that is operable for vibrating an optical element to impart retardance characteristics in primary light that is transmitted through the optical element at a first location in the optical element, comprising:

a source of diagnostic light arranged to transmit diagnostic light through the optical element at a second location that is spaced from the first location so that the optical element imparts retardance characteristics that are different from the retardance characteristics imparted in the primary light beam; and a detector arranged for detecting at least a portion of the diagnostic light transmitted through the second location of optical element.

15. The system of claim 14 including mounting means for mounting the diagnostic system in a manner that permits simultaneous transmission of the diagnostic light and the primary light through the optical element in a manner such that the diagnostic and primary light travel along substantially parallel paths in the optical element.

16. The system of claim 14 further comprising a housing for opaquely enclosing the optical element but for two discrete, transparent openings.

17. The system of claim 14 wherein the light source includes a collimating lens and polarizer.

18. The system of claim 14 wherein the detector includes a waveplate and an analyzer.

19. An integrated photoelastic modulator and diagnostic system comprising:

a photo elastic modulator including an optical element having a primary aperture through which primary light beam is directed;

a diagnostic system including a diagnostic light source for directing through the optical element a diagnostic light beam that is distinct from the primary light beam;

a detector for detecting diagnostic light that is directed through the optical element; and processing means for extrapolating from the detected diagnostic light a retardance characteristic imparted by the photoelastic modulator to the primary light.

20. The system of claim 19 including means for directing the primary and diagnostic light beams through the optical element so that the center of the beams are spaced apart a distance "D" from each other.

21. The system of claim 20 wherein the processing means uses the distance "D" in extrapolating the retardance characteristic imparted by the photoelastic modulator to the primary light.

22. The system of claim 19 wherein the diagnostic system includes means for directing the diagnostic light and the primary light through the optical element at different times.

23. The system of claim 19 further comprising feedback means for converting signals representing the extrapolated retardance characteristic into a control signal for the photoelastic modulator.

* * * * *